No. 761,387. PATENTED MAY 31, 1904.
E. MONTI.
PROCESS OF CONCENTRATING WINE, &c.
APPLICATION FILED NOV. 12, 1902.
NO MODEL. 2 SHEETS—SHEET 1.
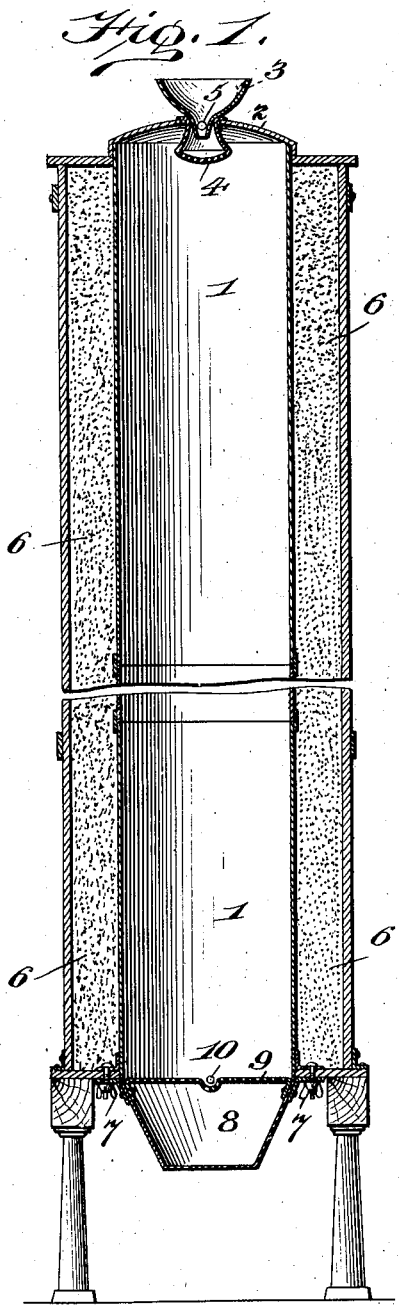
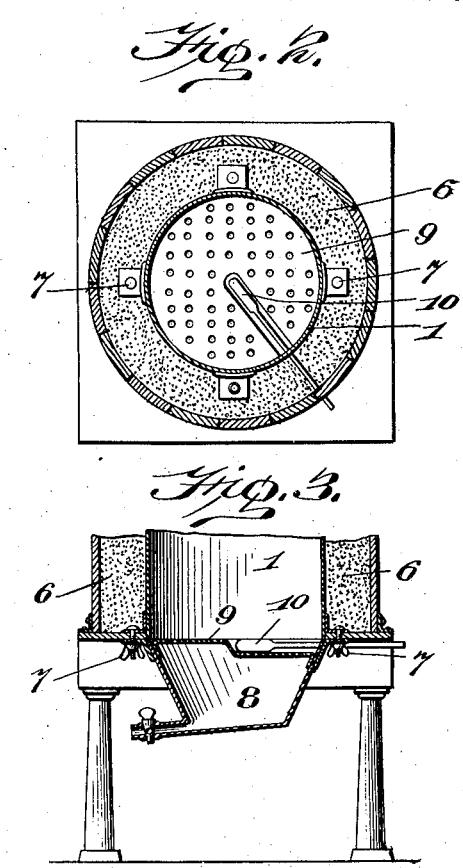
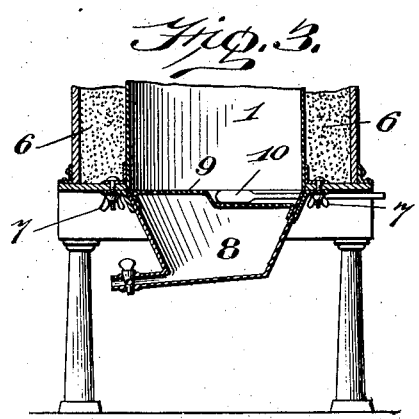
Inventor
Eudo Monti
Witnesses
H. G. Dieterich
H. H. Simms
By Knight Bros
Attorneys

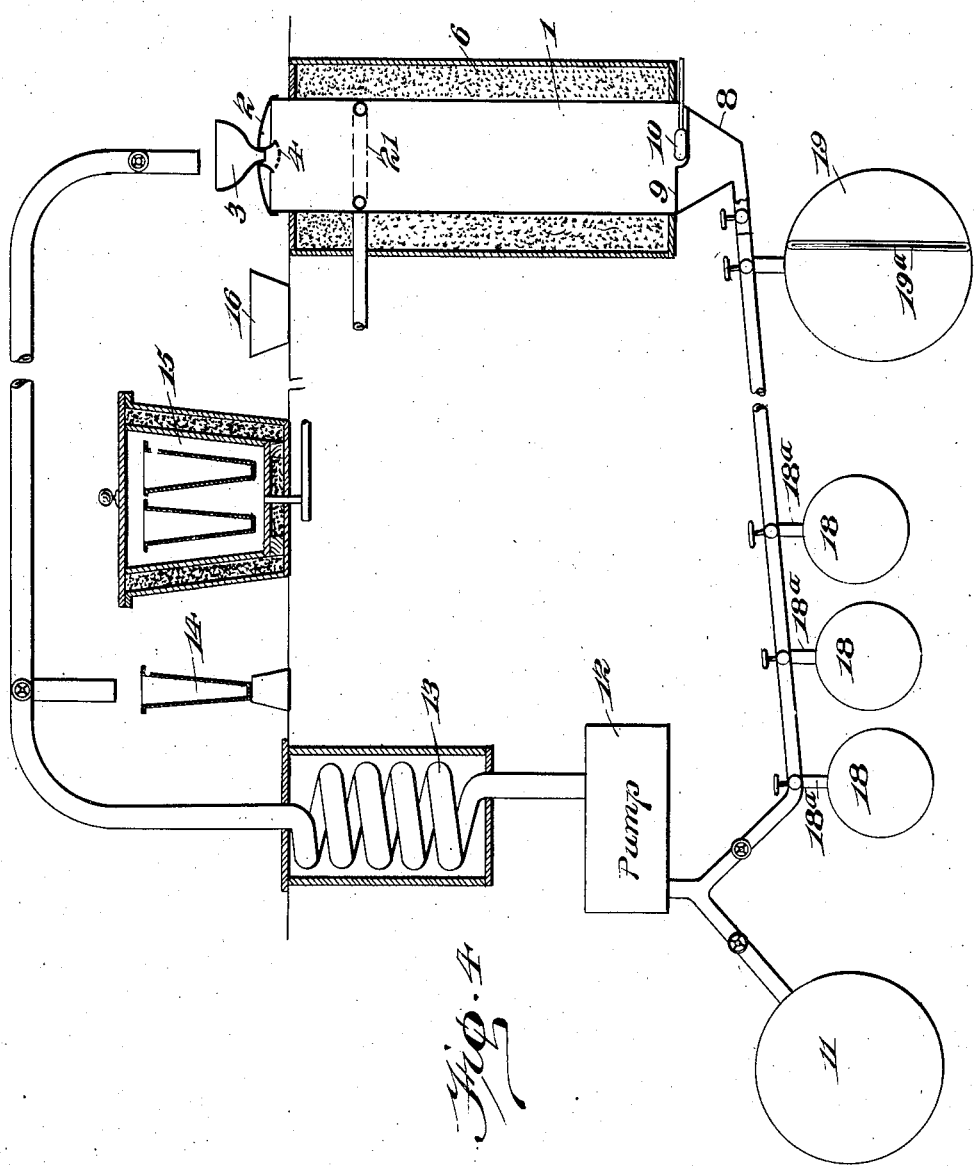

No. 761,387.

Patented May 31, 1904.

UNITED STATES PATENT OFFICE.

EUDO MONTI, OF TURIN, ITALY.

PROCESS OF CONCENTRATING WINE, &c.

SPECIFICATION forming part of Letters Patent No. 761,387, dated May 31, 1904.

Application filed November 12, 1902. Serial No. 131,054. (No specimens.)

*To all whom it may concern:*

Be it known that I, EUDO MONTI, a citizen of the Kingdom of Italy, residing in Turin, Italy, have invented new and useful Improvements in Processes of Concentrating Wine, Beer, Must, Sugar-Beet and Fruit Juice, or any other Alcoholic or Sugary Solution, of which the following is a specification.

The present invention relates to a process of extracting from fermented or ordinary alcoholic or sugary, acidiferous, or other fluids as much pure water as is necessary for securing the preservation and facilitating the transport of the fluids, the object of my invention being to provide a process of this kind which is very economical and by which the loss of useful matters is nearly avoided.

The practical application of the present invention may be carried out by means of several varieties of apparatuses; but in the annexed drawings one example only is represented.

In the drawings the present invention is illustrated as employed in connection with the common arrangements present in any ice-factory.

Figure 1 shows a vertical longitudinal section of an insulated vessel in which the alcohol and the other substances contained in the ice are extracted by washing with gradually more and more diluted liquids. Figs. 2 and 3 represent a horizontal and a transverse sectional section of the vessel shown in Fig. 1. Fig. 4 shows a diagrammatical view of the arrangement of the apparatuses.

My invention is founded on the well-known law relating to the molecular lowering of the melting-point of solutions and on the following facts, which have been ascertained and proved by numerous experiments:

If beer, wine, or in general an alcoholic, sugary, acidiferous, or other suitable fluid is cooled to a temperature which is different, corresponding to the nature and the concentration of the solution, and for fermented drinks is nearly equal to $-2, (t+1,)$ $t$ being the temperature at which the freezing of the original fluids commences to take place, (said temperature always being negative,) the fluid will partially condense into a crystallized ice mass, which is rather close together, but still permeable to fluids, and the soluble matters will concentrate at first in the liquid interposed between the ice crystals. The said matters concentrate in the liquid until the same is saturated and can be completely removed therefrom by capillarity, diffusion, or osmose by the application of a method similar to that used by extracting the sugary juice from beets, by which the gradually more and more diluted solutions serving as the displacing agents have been previously cooled to a temperature as near as possible to their freezing-point.

If the above crystal mass is deposited in a vessel well insulated against heat and gradually more and more diluted solutions, which have been previously cooled to 0° Celsius, are slowly introduced into the vessel, the ice but slightly melts, and the concentrated solution diffuses into the fluid strained through the ice. If the vessel is of sufficient height and the straining sufficiently slow, one obtains in this manner at first very concentrated, then gradually more and more diluted solutions, and finally almost completely-pure water.

The same portion of diluted solution can be used for an unlimited number of displacements, and at the end of each operation there will be obtained only concentrated solutions and pure ice, which latter is used for cooling displacing fluids poured into the vessel during the next operation.

During the first operations when no diluted and cooled displacing fluids are at hand the displacement can be effected by insulating the lower part only of the material against heat, and thereby the ice in the upper part is slowly melted. If the vessel is of sufficient height, the liquid flowing out is cooled to its melting-point, which, in accordance with the well-known law of the molecular lowering of the melting-point, is proportional to the concentration.

If the original fluid contains matters which are only slightly or which are not at all soluble in the concentrated solution, some of these, such as tartar, crystallize, while others—such as barium, albumen, dextrine—form between the ice crystals. Consequently it is by the present process impossible to concentrate a solution above the saturating-point at the melting temperature of the concentrated solution.

If a solution is cooled so much that the matters—such as sugar, citric acid, tannin, and so on—in the liquid interposed in the crystal mass crystallize or completely or for the most part form, the crystallized mass becomes impermeable, and it is impossible to effect the displacement without raising the temperature.

The oxygen of the atmosphere has a considerable and chiefly injurious effect on the taste of fermented drinks, plant-juice, &c. Therefore if a good result is to be obtained the concentration must, if possible, take place with the exclusion of air.

When good beer containing a very little amount of free acids is concentrated to twelve to fifteen per cent. alcohol and fifteen to twenty-five per cent. extract, it does not ferment and can under any climatic conditions be stored for an unlimited time without losing its taste.

The form of apparatus illustrated in the accompanying drawings will now be described.

The vessel 1 is made of strongly-tinned sheet metal (copper, aluminium, or another suitable metal which is not hurt by the concentration fluid) having a thickness of one to three millimeters and is closed by the removable cover 2, in which is situated a funnel 3, which conducts the displacing fluids into the strainer 4. The strainer 4 may of course be substituted by another suitable arrangement for distributing the fluid, and the entrance of the fluid is regulated by the cock 5. The vessel 1 is surrounded by an insulating-jacket 6 of a thickness of fifteen to twenty centimeters and is supported by standards or by other suitable means. Within the vessel 1 near its upper end is a pipe 21, through which water is conveyed around the upper part of the ice, and at the bottom of the vessel 1 is fixed, by means of screw-bolts F, a slightly-conical pocket 8, which is covered by a grate 9, also made of tin, copper, aluminium, or the like. The height of the vessel must not be less than two meters and not exceed five meters, and it may have any suitable diameter. Especial good results, however, will be obtained when the diameter is fifty to sixty centimeters, and a diameter of more than one meter cannot be recommended.

A thermometer 10 is arranged in a groove in the grate 9 in order that the exact melting-point of the extract fluid can be obtained. This thermometer must show the temperature at an exactness of a tenth of a degree and may of course be substituted by other suitable heat-indicators of equal exactness.

By means of the pump 12 the fluid to be concentrated, which is contained in the cask 11, is conducted into the refrigerating-coil 13, which is cooled by means of ice which has been left from a previous operation. The fluid cooled in this refrigerator is conducted to the well-tinned vessels 14, which are placed in the cooling mixture 15, and by means of a carriage or sloping pan 16 the ice masses thus made are then introduced by removing the cover 2 into the vessel 1, where they are reduced to small pieces and compressed. The soluble matters are extracted from the ice by washing at first with the original fluid contained in the cask 11 and cooled in the refrigerating-coil 13, and thereupon with the diluted displacing fluid from the vessels 18, which by means of pipes $18^a$ are consecutively connected with the pump 12 and the refrigerating-coil 13, from which the diluted displacing agent is conducted directly to the funnel 3 of the vessel 1. The part of the fluid which passes from the vessel 1, the medium temperature of which fluid is equal to that corresponding to the desired concentration, is conducted to the cask 19 until it has become completely clarified. The cask 19 is preferably provided with a graduated level-indicator $19^a$ in order that it can be seen how much fluid passes out at the different temperatures. The fluid last to pass from the vessel 1 is conducted to the casks 18, from which it is repumped to the refrigerating-coil for the purpose of extracting the alcohol or other soluble substances of a new charge of frozen fluid.

If the concentration obtained is not sufficient, the wine is not conducted to the cask 19, but is reconducted to the tinned vessel 14, where it is frozen at lower temperatures and when a second extraction of the alcohol, sugar, acid, &c., has taken place conducted to another cask.

As an example of the practical application of the present process I will describe the concentration of beer.

Suppose that it is desired to concentrate beer having a specific weight of 1.020 and containing four volumes per cent. alcohol and six weight per cent. dry extract. The melting-point is consequently nearly $-3.5°$ centigrade. By means of the pump 12 the refrigerating apparatus 15 is filled with the beer to be concentrated, and a salt solution having a temperature of $-12°$ is conducted around the beer until the water in the fluid is formed into a crystallized mass. This takes place as soon as the thermometer indicates $-2$ ($t-1$) or in the present case $-9°$. The current of the cooling mixture is now interrupted, and the crystallized mass is placed in the vessel 1, where the concentrated beer located among the ice is caused to drip off. Water having a suitable temperature ($10°$ to $15°$ centigrade) is then conducted around the upper part of the vessel by means of pipe 21. The water slowly melts the ice and produces a continuous flow of cooled fluid, which drives the beer from the lower part of the crystallic mass. If five hectoliters of beer have been placed in the vessel 1, there will by the first operation be obtained two hundred liters of beer having a specific weight of 1.042 and containing eight per cent. alcohol and twelve per cent. extract, then twenty-five liters of diluted beer containing nearly three per cent. alcohol, twenty-five liters containing two per cent., specific weight 1010, twenty-five liters containing one per cent., and, finally, twenty-five liters containing 0.5 per cent. alcohol. Thereupon the bottom 8 is removed, and the pure-ice cake weighing two hundred kilograms falls out. This ice easily crumbles, and its melting requires nearly sixteen thousand calories—that is to say, more than is necessary for cooling to 0° the five hectoliters of beer to be frozen during the next operation and the one hundred liters of diluted beer to be strained through the ice.

The ice is placed in the receptacle 13, and by means of the pump 12 the new portion of beer is conducted through the receptacle 13 to the refrigerating apparatus 15. When this beer enters the refrigerating apparatus 15, it has been cooled to 0°. The freezing is then effected at the same temperature as by the first operation; but provided that the circumstances are the same the freezing is effected more rapidly, as the beer is already cooled when it enters the refrigerating apparatus. As soon as the thermometer indicates — 9° the flow of the cooling mixture is cut off, the frozen liquid is conveyed to the vessel 1, and the cock in the bottom of the vessel is opened to permit the exit of the most-concentrated beer, and when nothing more runs out there is slowly conducted into the vessel 1 on a piece of cloth covering the ice cake first the twenty-five liters of diluted beer containing three per cent. alcohol and afterward gradually more and more diluted beer. It is then ascertained whether all soluble matters have been extracted or whether it is necessary to strain twenty to twenty-five liters melting water through the vessel. By this second operation is obtained not two hundred but two hundred and fifty liters of concentrated beer, and if the vessel 1 is carefully insulated two hundred and fifty instead of two hundred kilograms of ice. Further, there is obtained one hundred and twenty-five liters diluted beer, which is stored in several different vessels and used for the following operation. The process is continued in this manner and an unlimited number of operations effected, and if the cylinder is carefully insulated the volume of the diluted displacing fluids remains constant. The beer containing eight per cent. alcohol and twelve per cent. extract is well suited for storing, and in temperate climates it may even be transported in casks without refrigeration.

If it is desired to transport beer in non-refrigerated wagons in hot countries, a concentration containing thirteen per cent. alcohol and nineteen to twenty per cent. extract is necessary. For this purpose the process is carried out in the following manner: The concentrated beer is conducted to another refrigerating apparatus and is cooled to —18° centigrade by means of a solution of chlorid of calcium having a temperature of —24° centigrade. The soluble matters are then extracted from the ice by first pouring into the vessel 1 one hectometer of cooled and concentrated beer containing eight per cent. and then pouring one hundred and twenty-five liters of gradually more and more diluted cooled solutions obtained by the previous operation and serving for a desired number of operations. As a result is obtained three hundred and fifty liters of beer having a specific weight of nearly 1.064 and containing thirteen per cent. alcohol and eighteen to twenty per cent. sugar and extract substances. In this operation it is necessary to employ the displacing fluid from the first concentration not only for obtaining the extraction, but also for redissolving the dextrine which has precipitated and which after it has been dissolved in the comparatively diluted beer passing out at the end of the operation partly precipitates when the diluted beer is partly mixed with the very concentrated beer which has passed away first. The dextrine, however, must be separated from the ice, as it when the beer is diluted for consumption redissolves and, together with the carbonic acid, is necessary for imparting to the beer diluted by pure water the taste and character of the original beer. Wine, sugary and acidiferous juices, glycerin, paints, and tanning extracts, coffee, tea, and other desired solutions can be concentrated in the same manner to the desired degree of concentration by means of one, two, and even three operations corresponding to the quantity of water, which must be removed therefrom for the obtainment of the desired degree of concentration.

What I claim, and desire to secure by Letters Patent, is—

1. A process of concentrating fluids which consists in freezing the fluid to crystallize one of the ingredients thereof, and displacing the other ingredients by a fluid at a temperature approximately the freezing-point of the crystallized mass.

2. A process of concentrating fluids which consists in freezing the fluid to crystallize one of the ingredients thereof, and displacing the other ingredients by a solution of the same fluid containing more of the crystallized ingredient and at a temperature approximately the freezing-point of the crystallized ingredient.

3. A process of concentrating fluids which consists in freezing the fluid to crystallize one of the ingredients thereof, and displacing the other ingredients by solutions of the same fluid containing gradually more and more of the crystallized ingredient and at a temperature approximately the freezing-point of the crystallized mass.

4. A process of concentrating fluids containing water which consists in freezing the fluid to crystallize the water and displacing the other ingredients by sending through the crystallized ice mass a weaker solution of the fluid to be concentrated.

5. A process of concentrating fluids containing water which consists in freezing the fluid to crystallize the water and displacing the other ingredients by sending through the crystallized ice mass a fluid at a temperature approximately the freezing-point of water.

6. A process of concentrating fluids containing water which consists in freezing the fluid to crystallize the water and displacing the other ingredients by sending through the crystallized ice mass solutions of the same fluid containing gradually more and more water.

7. A process of concentrating fluids containing water which consists in freezing the fluid to crystallize the water and displacing the other ingredients by sending through the crystallized ice mass solutions of the same fluid containing gradually more and more water at a temperature approximately the freezing-point of water.

8. A process of concentrating fluids containing water which consists in freezing the fluid to crystallize the water and displacing the other ingredients by sending through the crystallized ice mass solutions of the same fluid containing gradually more and more water at a temperature approximately the freezing-point of water and obtained from a previous operation.

9. A process of concentrating fluids which consists in freezing the fluid to a temperature proportionate to the degree of concentration desired and displacing the other ingredients by sending through the crystallized mass thus formed solutions obtained from previous operations, containing gradually more and more of the crystallized ingredient and at a temperature approximately the freezing-point of the crystallized mass.

10. A process of concentrating fluids which consists in freezing a fluid to crystallize one of the ingredients thereof and heating the upper part of the crystallized mass to displace the other ingredients of the lower part of the mass.

In testimony whereof I have signed my name to this specification in the presence of two subscribing witnesses.

EUDO MONTI. [L. S.]

In presence of—
HENRY V. PYZOTTI,
CLEMENTE GACHETTI.